United States Patent
Lee et al.

(10) Patent No.: US 12,422,129 B1
(45) Date of Patent: Sep. 23, 2025

(54) BACKLIGHT MODULE AND ASSEMBLY METHOD THEREOF

(71) Applicant: AUO Corporation, Hsinchu (TW)

(72) Inventors: Yin-Ting Lee, Hsinchu (TW); Hui-Chuan Chen, Hsinchu (TW); Bo-Yuan Su, Hsinchu (TW); Pei-Chia Wu, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/975,298

(22) Filed: Dec. 10, 2024

(51) Int. Cl.
*G02F 1/13357* (2006.01)
*F21V 19/00* (2006.01)

(52) U.S. Cl.
CPC .... *F21V 19/0025* (2013.01); *G02F 1/133603* (2013.01)

(58) Field of Classification Search
CPC .......... G02F 1/133603; F21V 19/0025; F21V 19/003; F21V 19/004; F21V 19/0045
See application file for complete search history.

(56) References Cited

U.S. PATENT DOCUMENTS

| | | |
|---|---|---|
| 2006/0178050 A1 | 8/2006 | Kim et al. |
| 2008/0089076 A1 | 4/2008 | Hsiao et al. |
| 2008/0315214 A1* | 12/2008 | Wall, Jr. ............. H10H 20/8582 257/E33.001 |

FOREIGN PATENT DOCUMENTS

| | | |
|---|---|---|
| CN | 213904008 U | 8/2021 |
| KR | 20090095996 A | 9/2009 |
| TW | 200921197 A | 5/2009 |
| TW | 201111870 A | 4/2011 |
| TW | I393949 B1 | 4/2013 |
| TW | I414851 B | 11/2013 |
| WO | 2013159367 A1 | 10/2013 |

* cited by examiner

*Primary Examiner* — Sean P Gramling
(74) *Attorney, Agent, or Firm* — Tim Tingkang Xia, Esq.; Troutman Pepper Locke LLP

(57) ABSTRACT

A backlight module includes a back plate, a conductive colloid disposed on a surface of the back plate, and a lighting board. The back plate includes a positioning portion. The lighting board includes a substrate and a plurality of light-emitting components. A first surface of the substrate is divided into a light-emitting region adjacent to a first side of the substrate and a peripheral region adjacent to a second side of the substrate. The peripheral region includes a slot penetrating through the first surface and a second surface of the substrate and extending to the second side. The substrate is sleeved on and positioned to the positioning portion by the slot. The positioning portion abuts against the peripheral region. The substrate faces toward the back plate and is adhered to the conductive colloid by the second surface. A position of the conductive colloid corresponds to the light-emitting region.

18 Claims, 8 Drawing Sheets

BACKLIGHT MODULE AND ASSEMBLY METHOD THEREOF

CROSS-REFERENCE TO RELATED PATENT APPLICATION

This non-provisional application claims priority to and the benefit of, pursuant to 35 U.S.C. § 119(a), patent application Serial No. 113120914 filed in Taiwan on Jun. 5, 2024. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a backlight module and an assembly method thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A backlight module typically includes a back plate and a lighting board, where the lighting board is fixedly disposed on the back plate. Currently, for structural stability, most manufacturers employ double-sided adhesive between the back plate and the lighting board to adhere the lighting board to the back plate. Thus, the structural stability of the backlight module meets the requirement. However, when the components located between the back plate and the lighting board in the backlight module or certain components of the lighting board are damaged, due to the complete adhesion by the double-sided adhesive between the lighting board and the back plate, there is no specific point of force for a user to apply when attempting to disassemble the lighting board and the back plate, thus making it difficult to disassemble the backlight module, and the user may have difficulties to independently disassemble the backlight module for maintenance, repair or component replacement. Therefore, the entire backlight module is often discarded even with only partial damages, causing unwanted waste generation and resource waste.

SUMMARY

One aspect of the present disclosure provides a backlight module, which includes a back plate, conductive colloids and a lighting board. The back plate includes a positioning portion. The conductive colloids are disposed on a surface of the back plate. The lighting board includes a substrate and a plurality of light-emitting components. The substrate includes a first side and a second side opposite to each other and a first surface and a second surface opposite to each other. The first surface of the substrate is divided into a light-emitting region and a peripheral region. The light-emitting region is adjacent to the first side, and the peripheral region is adjacent to the second side. The peripheral region has a slot, and the slot penetrates through the first surface and the second surface and extends to the second side. The substrate is sleeved on and positioned to the positioning portion by the slot. The positioning portion abuts against the peripheral region. The substrate faces toward the back plate and is adhered to the conductive colloids by the second surface, and positions of the conductive colloids correspond to the light-emitting region. The light-emitting components are disposed on the light-emitting region.

Thus, the lighting board may be configured at the precise position on the back plate by the positioning of the slot and the positioning portion, and the conductive colloids provide the bonding force after the lighting board is positioned on the precise position on the back plate. As such, by the partially detachable relative structures and the partial fixing and bonding between the lighting board and the back plate, the difficulty of detaching the lighting board and the back plate is reduced, which is convenient to the disassembly of the lighting board, facilitating maintenance and repair of the lighting board, which may be used for reworking, remanufacturing or refurbishment, thus promoting a circular economy.

In certain embodiments, the lighting board further includes a flip chip adhesive layer, covering and disposed on the first surface of the substrate and corresponding to the light-emitting region.

In certain embodiments, the positioning portion includes a coupling section and an abutting section, the coupling section is perpendicularly coupled to the back plate, the abutting section is perpendicularly coupled to the coupling section, and an extending direction of the abutting section is parallel to the first side and the second side.

In certain embodiments, a direction perpendicular to the first surface and the second surface is defined as a first direction, the coupling section has a first thickness in the first direction, the substrate has a second thickness between the first surface and the second surface in the first direction, and the first thickness is equal to the second thickness.

In certain embodiments, the lighting board further includes a flip chip adhesive layer, covering and disposed on the first surface of the substrate and corresponding to the light-emitting region, the back plate has a third thickness in the first direction, the flip chip adhesive layer has a fourth thickness in the first direction, and a sum of the first thickness and the third thickness is less than or equal to a sum of the second thickness and the fourth thickness.

In certain embodiments, the positioning portion further includes a turning portion located at a coupling location of the coupling section and the abutting section, and a mechanical strength of the turning portion is less than a mechanical strength of the coupling section and a mechanical strength of the abutting section.

In certain embodiments, the turning portion is a cut mark or a groove.

In certain embodiments, a direction perpendicularly connecting the first side and the second side is defined as a second direction, the peripheral region has a first width in the second direction, the slot has a second width in the second direction, and the second width is less than the first width.

In certain embodiments, the second surface of the substrate has a plurality of exposed copper regions, and the conductive colloids are disposed on the exposed copper regions.

Another aspect of the present disclosure provides an assembly method of a backlight module, which includes: providing a back plate, comprising a positioning portion; providing a plurality of conductive colloids, disposed on a side of the back plate; providing a lighting board, comprising a slot, wherein the lighting board is sleeved on the positioning portion by the slot in a direction parallel to the back plate and is adhered to the conductive colloids; and bending the positioning portion such that the positioning portion abuts against the lighting board.

These and other aspects of the present disclosure will become apparent from the following description of the embodiment taken in conjunction with the following drawings, detailed description and the claims.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
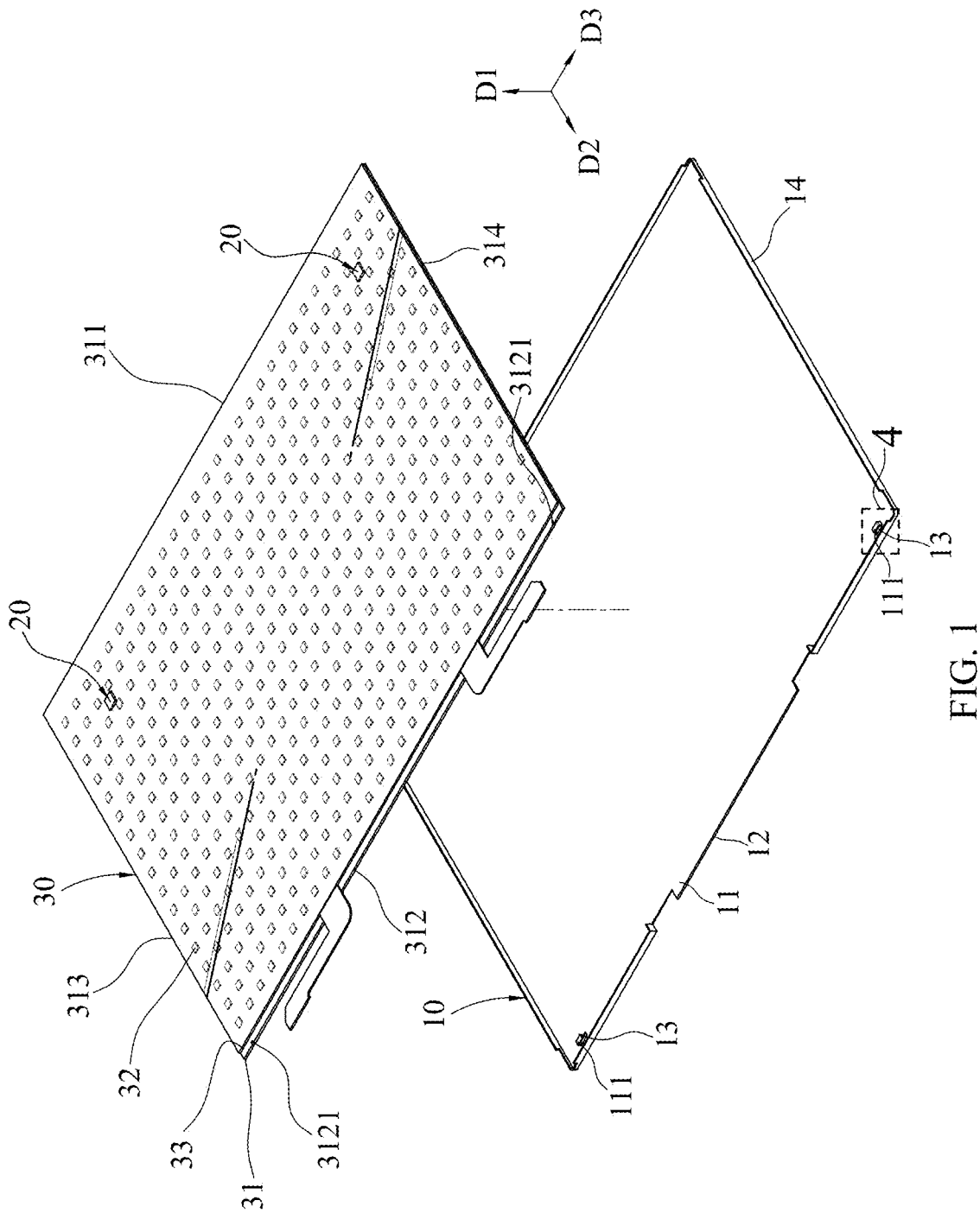
FIG. 1 is a structural disassembled schematic view of a backlight module according to one embodiment of the present disclosure.
Figure 2:
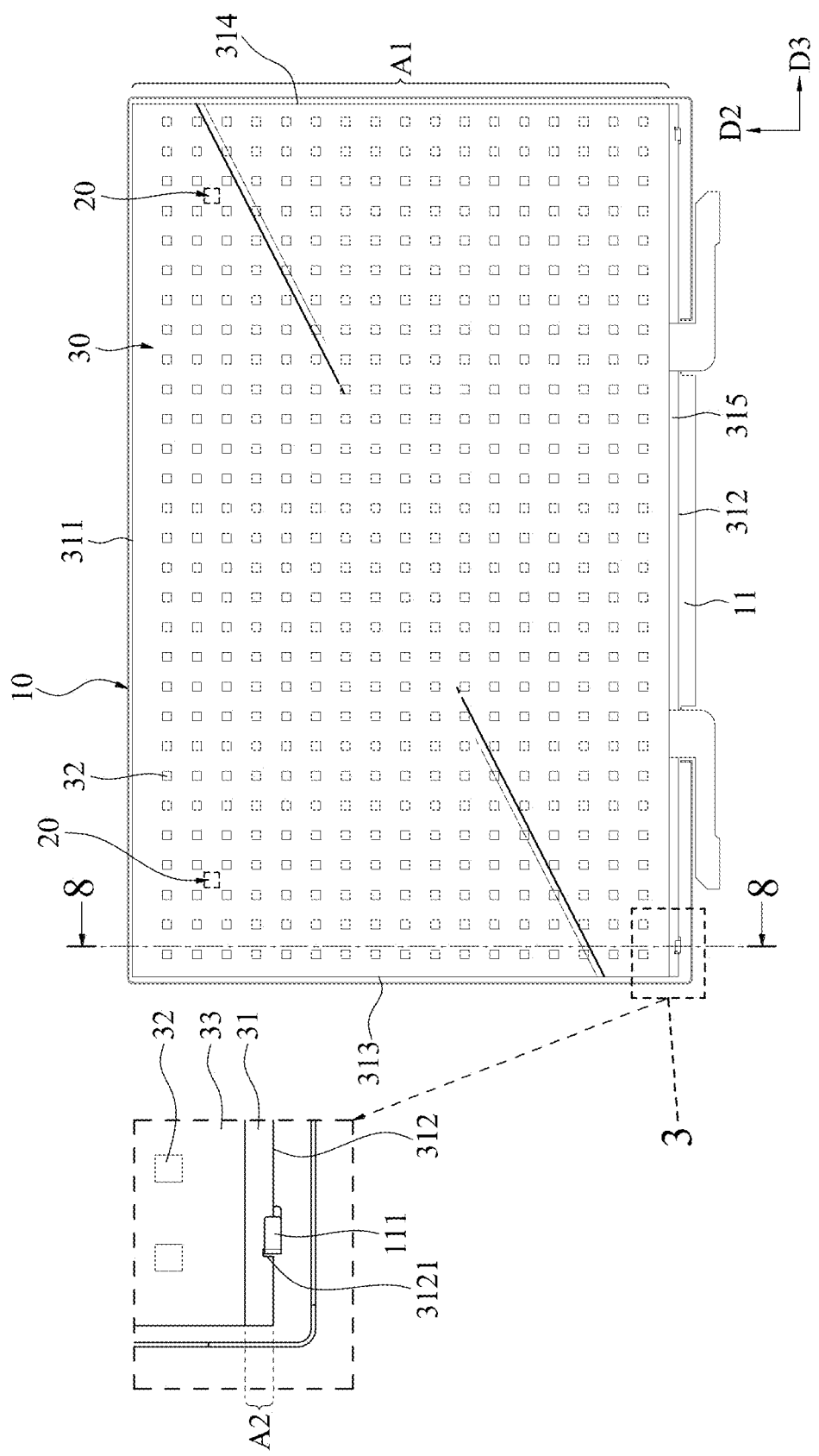
FIG. 2 is an assembled plain schematic view of a backlight module according to one embodiment of the present disclosure.
Figure 3:
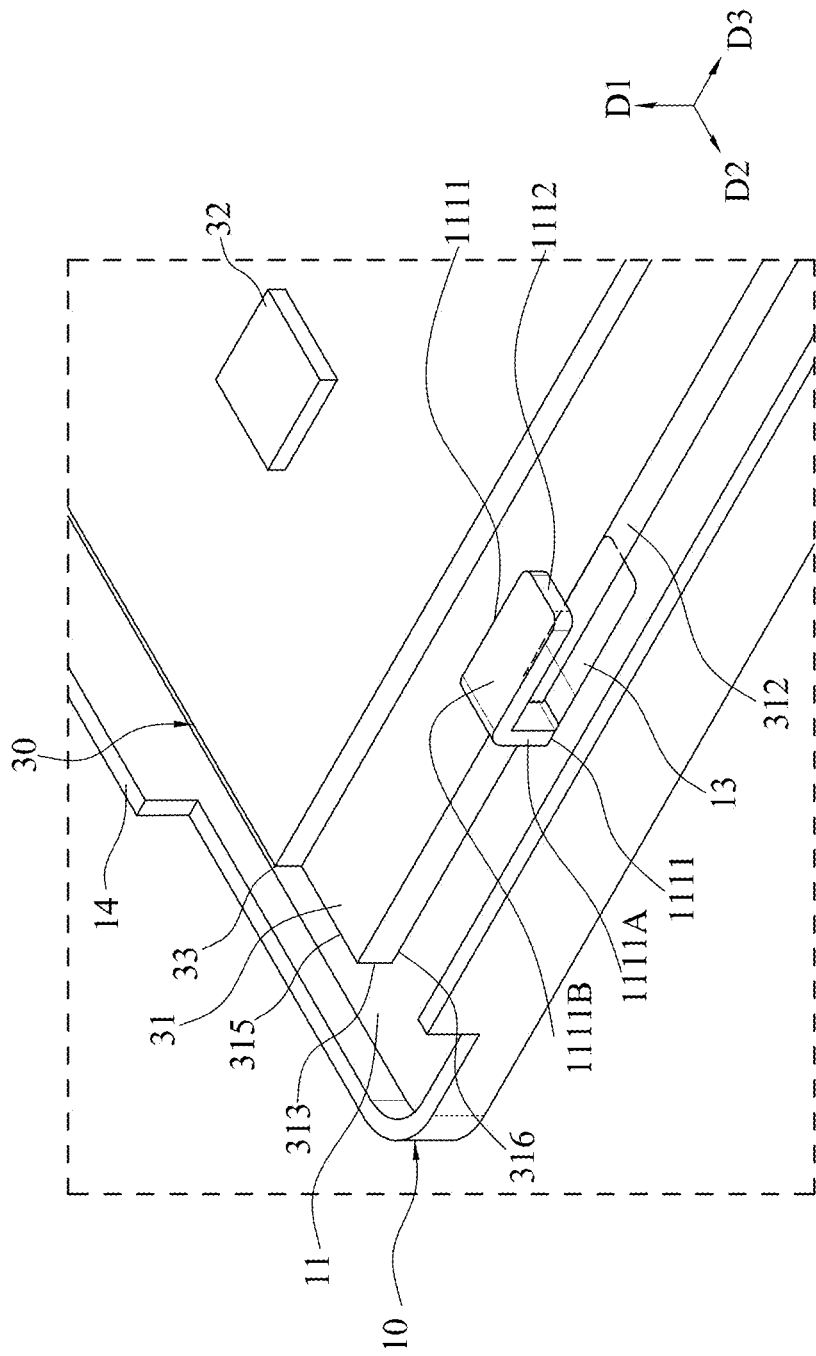
FIG. 3 is a partial perspective schematic view of a portion 3 in FIG. 2.

Referring to FIGS. 1 to 3, FIG. 1 is a structural disassembled schematic view of a backlight module according to one embodiment of the present disclosure; FIG. 2 is an assembled plain schematic view of a backlight module according to one embodiment of the present disclosure; and FIG. 3 is a partial perspective schematic view of a portion 3 in FIG. 2. One aspect of the present disclosure provides a backlight module, which mainly includes a back plate 10, conductive colloids 20 and a lighting board 30. The back plate 10 includes a positioning portion 111. The conductive colloids 20 are disposed on a surface of the back plate 10.

The lighting board 30 includes a substrate 31 and a plurality of light-emitting components 32. The substrate 31 includes a first side 311 and a second side 312 opposite to each other and a first surface 315 and a second surface 316 opposite to each other. The first surface 315 of the substrate 31 is divided into a light-emitting region A1 and a peripheral region A2. The light-emitting region A1 is adjacent to the first side 311, and the peripheral region A2 is adjacent to the second side 312. The peripheral region A2 has a slot 3121, and the slot 3121 penetrates through the first surface 315 and the second surface 316 and extends to the second side 312. The substrate 31 is sleeved on and positioned to the positioning portion 111 by the slot 3121. The positioning portion 111 abuts against the peripheral region A2. The substrate 31 faces toward the back plate 10 and is adhered to the conductive colloids 20 by the second surface 316, and positions of the conductive colloids 20 correspond to the light-emitting region A1.

Thus, the lighting board 30 may be configured at the precise position on the back plate 10 by matching the slot 3121 with the positioning portion 111 of the back plate 10, and the conductive colloids 20 provide the bonding force after the lighting board 30 is positioned on the precise position on the back plate 10. As such, by the partially detachable relative structures and the partial fixing and bonding between the lighting board 30 and the back plate 10, the difficulty of detaching the lighting board 30 and the back plate 10 is reduced, which is convenient to the disassembly of the lighting board 30, facilitating maintenance and repair of the lighting board 30, which may be used for reworking, remanufacturing or refurbishment, thus promoting a circular economy.

Referring to FIGS. 1 to 3, the back plate 10 is used to support and position the lighting board 30 at the precise assembling position. In certain embodiments, the back plate 10 may be a flat plate structure and has a front surface 11 and a back surface 12 opposite to each other, and the positioning portion 111 protrudes from the front surface 11 of the back plate 10. Thus, the coupling of the positioning portion 111 and the back plate 10 is perpendicular coupling. In certain embodiments, the back plate 10 is made of a material with strength and plastic deformation, such as, without being limited to, a metal material. In these embodiments, the positioning portion 111 may be a sheet structure formed by punching and then bending.

Referring to FIG. 1, in certain embodiments, a direction perpendicular to the front surface 11 and the back surface 12 of the back plate 10 is defined as a first direction D1, and the main plane of the back plate 10 is formed by a second direction D2 and a third direction D3 perpendicular to the first direction D1 and perpendicular to each other.

Figure 4:
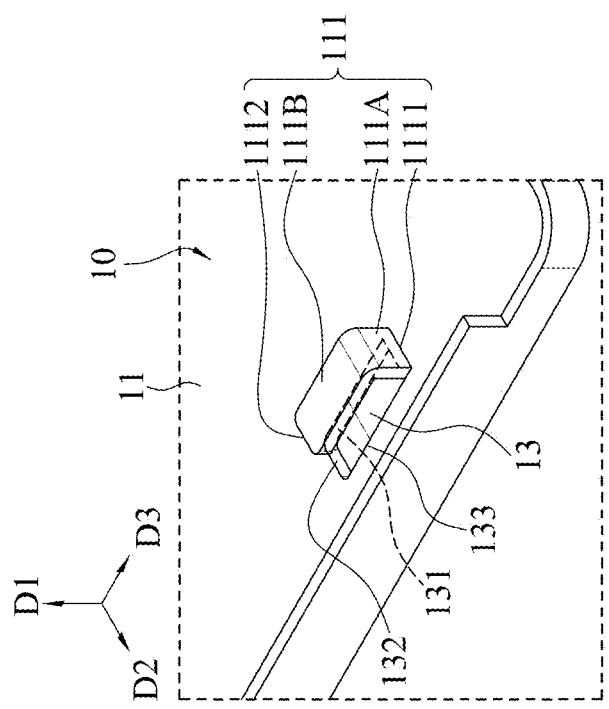
FIG. 4 is a partial enlarged view of a portion 4 in FIG. 1.

Referring to FIG. 4, FIG. 4 is a partial enlarged view of a portion 4 in FIG. 1. In certain embodiments, the back plate 10 further includes a cut 13. The cut 13 includes a first cutting edge 131, a second cutting edge 132 and a third cutting edge 133. The first cutting edge 131, the second cutting edge 132 and the third cutting edge 133 respectively penetrate through the front surface 11 and the back surface 12 and are sequentially interconnected. The first cutting edge 131 and the third cutting edge 133 are parallel to and separated from each other, and the second cutting edge 132 is perpendicularly connected between one end of the first cutting edge 131 and one end of the third cutting edge 133. Thus, the range surrounded by the first cutting edge 131, the second cutting edge 132 and the third cutting edge 133 of the cut 13 defines the positioning portion 111 in the shape of a cantilever beam structure. In these embodiments, the second cutting edge 132 extends along the second direction D2, and the first cutting edge 131 and the third cutting edge 133 extend along the third direction D3.

Referring to FIG. 4, in certain embodiments, the positioning portion 111 has a first end 1111 and a second end 1112 opposite to each other. The first end 1111 is located between the other end of the first cutting edge 131 and the other end of the third cutting edge 133, and the second end 1112 is a free end away from the first end 1111. Thus, based on the material selection of the plastic deformation of the back plate 10 and the configurations of the first cutting edge 131, the second cutting edge 132 and the third cutting edge 133, the first end 1111 of the positioning portion 111 is in a bendable and deformable state. In details, when the first end 1111 of the positioning portion 111 does not bend, the positioning portion 111 may be located in the cut 13, and when the first end 1111 of the positioning portion 111 bends, the positioning portion 111 is released from the cut 13.

The conductive colloids 20 are made of adhesive materials with electrical conductivity, and are used to conductively adhere the lighting board 30. In certain embodiments, the conductive colloids 20 may be, without being limited to, a conductive silver paste, a conductive copper paste or a conductive graphite paste.

Figure 5:
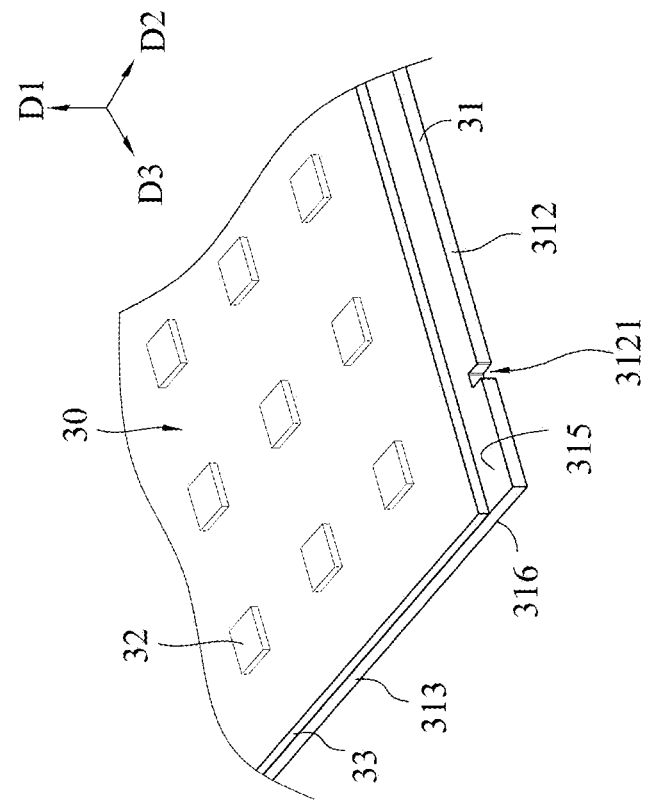
FIG. 5 is a partial enlarged schematic view of a lighting board of a backlight module according to one embodiment of the present disclosure.

Referring to FIGS. 1 and 5, FIG. 5 is a partial enlarged schematic view of a lighting board of a backlight module according to one embodiment of the present disclosure. The substrate 31 of the lighting board 30 is used to support the light-emitting components 32 to be combined to the back plate 10. In certain embodiments, the dimension of the substrate 31 is slightly less than that of the back plate 10. The substrate 31 is a flat plate structure with its thickness extending the first direction D1 and a flat surface formed along the second direction D2 and the third direction D3. In these embodiments, the substrate 31 is a rectangular plate which includes a first side 311, a second side 312, a third side 313 and a fourth side 314. The first side 311 is parallel to and opposite to the second side 312, and the third side 313 is parallel to and opposite to the fourth side 314. The third side 313 and the fourth side 314 are perpendicularly coupled between the two ends of the first side 311 and the second side 312.

Referring to FIG. 2, in these embodiments, the first surface 315 of the substrate 31 is divided into the light-emitting region A1 and the peripheral region A2 in the second direction D2. In other words, a partial range of the first surface 315 of the substrate 31 adjacent to the first side 311 in the second direction D2 is the light-emitting region A1, and the light-emitting region A1 extends throughout the entire range of the third direction D3 in the partial range of the first surface 315 of the substrate 31 in the second direction D2.

Referring to FIG. 2, the remaining range of the first surface 315 of the substrate 31 adjacent to the second side 311 in the second direction D2 is the peripheral region A2, and the peripheral region A2 extends throughout the entire range of the third direction D3 in the remaining range of the first surface 315 of the substrate 31 in the second direction D2. In certain embodiments, a length occupied by the light-emitting region A1 of the substrate 31 in the second direction D2 is 97% to 98.5% of a total length of the substrate 31 in the second direction D2, and a length occupied by the peripheral region A2 of the substrate 31 in the second direction D2 is 1.5% to 3% of the total length of the substrate 31 in the second direction D2, thus maximizing the area of the light-emitting region A1 of the lighting board 30, and ensuring the resources used may be fully effective.

Referring to FIGS. 2 and 5, in certain embodiments, the slot 3121 of the substrate 31 is open from the second side 312 and has its length extending along the second direction D2, thus allowing the substrate 31 to be assembled in a vertical movement path along the first direction D1.

Figure 6:
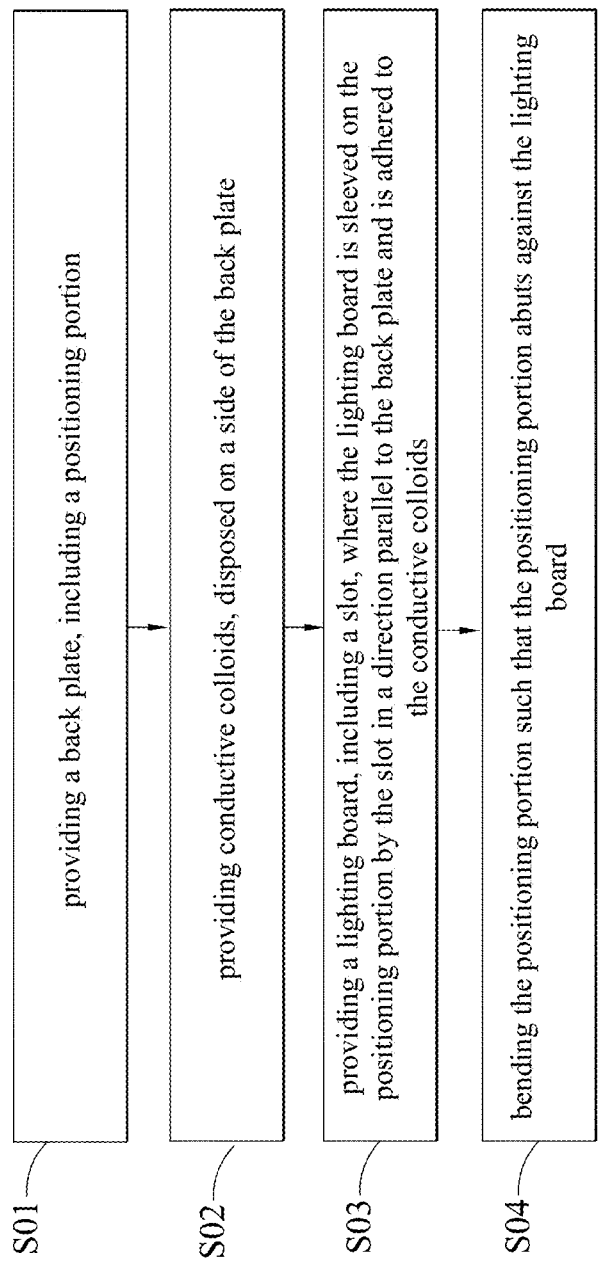
FIG. 6 is a flowchart of an assembly method of a backlight module according to one embodiment of the present disclosure.
Figure 7:
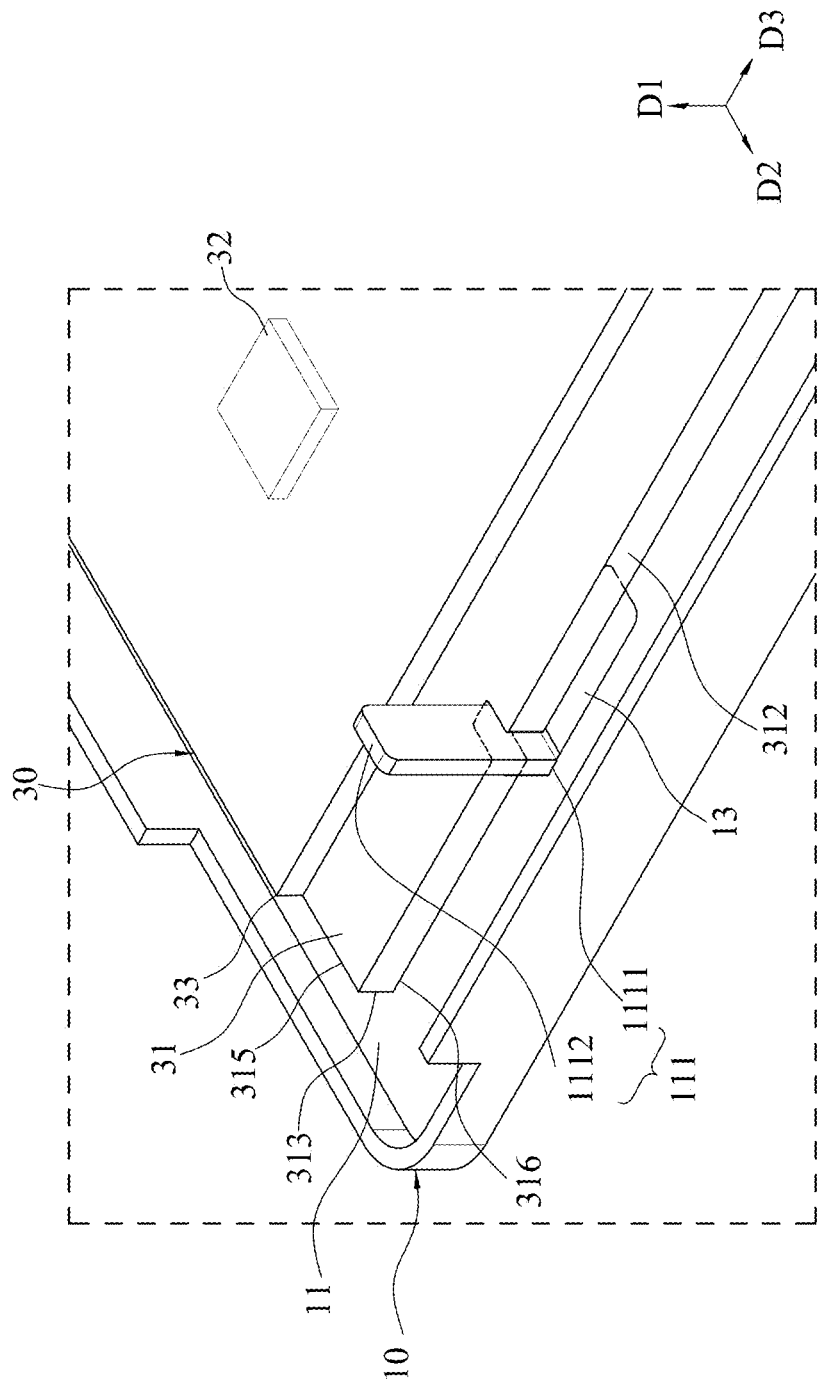
FIG. 7 is an assembling process schematic view of an assembly method of a backlight module according to one embodiment of the present disclosure.

Referring to FIG. 6, FIG. 6 is a flowchart of an assembly method of a backlight module according to one embodiment of the present disclosure. Another aspect of the present disclosure provides an assembly method of a backlight module, which mainly includes the following steps:

Step S01: referring to FIGS. 1, 6 and 7, FIG. 7 is an assembling process schematic view of an assembly method of a backlight module according to one embodiment of the present disclosure. A back plate 10 is provided, and the back plate includes a positioning portion 111. In certain embodiments, in the step S01, the positioning portion 111 protrudes from the front surface 11, and a connecting direction of the first end 1111 and the second end 1112 of the positioning portion 111 extends along the first direction D1. In other words, the positioning portion 111 perpendicularly protrudes from the front surface 11 of the back plate 10 in this state. It should be noted that, before the step S01, the positioning portion 111 on the back plate 10 may be in a plain state coplanar to the front surface 11 and the back surface 12, and when the step S01 is to be performed, the positioning portion 111 bends such that the positioning portion 111 is in the state of protruding from the front surface 11. Thus, the positioning portion 111 may bend to be in a state perpendicular to the front surface 11 as shown in FIG. 7, which is convenient for subsequent assembling of the lighting board 30.

Step S02: a plurality of conductive colloids 20 are provided to be disposed on a side of the back plate 10. In certain embodiments, in the step S02, the conductive colloids 20 are disposed between the back plate 10 and the lighting board 30 and correspond to the exposed copper regions of the lighting board 30. Thus, when the lighting board 30 is combined to the back plate 10 by the conductive colloids 20, it is simultaneously electrically connected to the peripheral electronic components (such as the flexible circuit board). In certain embodiments, the exposed copper regions of the lighting board 30 are located on the second surface 316 and correspond to the light-emitting region A1. It should be noted that the conductive colloids 20 may be firstly adhered to the back plate 10, and then the lighting board 30 is adhered to the conductive colloids 20 on the back plate 10. Alternatively, the conductive colloids 20 may be firstly adhered to the lighting board 30, and then the lighting board 30 as well as the conductive colloids 20 are adhered to the back plate 10. The present disclosure is not limited thereto.

Step S03: referring to FIGS. 6 and 7, a lighting board 30 is provided, where the lighting board 30 includes a slot 3121, and the lighting board 30 is sleeved on the positioning portion 111 by the slot 3121 in a direction parallel to the back plate 10 and is adhered to the conductive colloids 20. In certain embodiments, in the step S03, the lighting board 30 is parallel to a side of the back plate 10 by the second surface 316 of the substrate 31 facing toward the front surface 11 of the back plate 10. Then the position of the slot 3121 of the second side 312 of the substrate 31 corresponds to the positioning portion 111. Then, the substrate 31 moves along the first direction D1, such that the opening position of the slot 3121 of the substrate 31 is sleeved on the positioning portion 111. After the slot 3121 of the substrate 31 is sleeved on the positioning portion 111, the substrate 31 keeps moving such that the second surface 316 of the substrate 31 is attached to the front surface 11 of the back plate 10.

Step S04: the positioning portion 111 bends such that the positioning portion 111 abuts against the lighting board 30. Referring to FIGS. 6 and 3, in certain embodiments, the positioning portion 111 bends such that the second end 1112 of the positioning portion 111 faces toward and moves closer to the first surface 315 of the substrate 31, such that the positioning portion 111 finally is attached to and abuts against the first surface 315 of the substrate 31 (as shown in the state of FIG. 3). Thus, the positioning portion 111 may limit the movement of the lighting board 30 in the first direction D1.

As previously described, during the assembling process of the backlight module, the slot 3121 and the positioning portion 111 are matched to position the lighting board 30 to the precise position, and then lighting board 30 and the back plate 10 are close together such that the conductive colloids 20 adhere the lighting board 30 and the back plate 10. After the completion of the assembly of the backlight module, the partial range of the lighting board 30 close to the first side 311 is adhered by the conductive colloids 20, and the second side 312 of the lighting board 30 is positioned to match with the positioning portion 111. The back plate 10 and the lighting board 30 do not require full-surface adhesive bonding to provide the structural stability with a certain quality.

When disassembling the backlight module, the positioning portion 111 simply bends to detach the second end 1112 of the positioning portion 111 from the substrate 31, thereby releasing the positioning between the second side 312 of the substrate 31 of the lighting board 30 and the back plate 10. Thus, the positioning portion 111 preferably bends to a state perpendicular to the front surface 11 of the back plate 10 (as shown in FIG. 7). In this state, the second side 312 of the substrate 31 of the lighting board 30 may be detached from the back plate 10 by moving it along the first direction D1. In the condition where the second side 312 of the substrate 31 of the lighting board 30 is detached from the back plate 10, the operator may hold the partial position of the substrate 31 being detached from the back plate 10 and apply a force thereto, such that the substrate 31 of the lighting board 30 is completely separated from the conductive colloids 20 and the back plate 10, thereby facilitating the disassembly of the lighting board 30 and the back plate 10. When certain components of the lighting board 30 of the backlight module are damaged, the lighting board 30 may be disassembled for repair, thus eliminating the need to discard or replace the entire backlight module, extending the service life of the backlight module, and avoiding the waste of undamaged resources. In addition to reducing the waste generation, it also reduces resource consumption and extends resource utilization time, thereby further promoting the benefits of a circular economy.

Referring to FIGS. 1 and 7, in certain embodiments, the thickness of the front surface 11 to the back surface 12 of the back plate 10 in the first direction D1 is approximately equal to a width of the slot 3121 in the third direction D3. Thus, after performing the step S03 (as shown in the state of FIG. 7), the lighting board 30 is sleeved on the positioning portion 111 by the slot 3121 of the substrate 31, and the matching between the slot 3121 and the positioning portion 111 may limit the movement of the substrate 31 in the third direction D3, thereby obtaining a preliminary positioning. Thus, when the lighting board 30 is firstly sleeved on the positioning portion 111 by the substrate 31 and subsequently adhered to the conductive colloids 20, the position of the lighting board 30 is limited, thus ensuring the lighting board 30 to be in contact and adhered to the conductive colloids 20 by the exposed copper regions. The assembly personnel does not need to observe the relative position of the back plate 10 and the lighting board 30, and as long as the lighting board 30 is sleeved on the positioning portion 111 by the slot 3121, the precise position of the lighting board 30 is ensured, thus reducing the assembly complexity and enhancing assembly efficiency.

Referring to FIG. 5, in certain embodiments, the lighting board 30 is a lighting board with a flip chip package. In these embodiments, the light-emitting components 32 are light emitting diodes (LEDs), and the lighting board 30 further includes a flip chip adhesive layer 33. The flip chip adhesive layer 33 is disposed on the light-emitting region A1 of the first surface 315 of the substrate 31 and covers the light-emitting components 32.

Referring to FIGS. 1, 3 and 4, in certain embodiments, the positioning portion 111 of the back plate 10 includes a coupling section 111A and an abutting section 111B coupled to each other. The first end 1111 is located at an end of the coupling section 111A away from the abutting section 111B, and the second end 1112 is located at an end of the abutting section 111B away from the coupling section 111A. After the step S04, the positioning portion 111 is divided into the coupling section 111A and the abutting section 111B by a bending location. In certain embodiments, the coupling section 111A is perpendicularly coupled to the front surface of the back plate 10, the abutting section 111B is perpendicularly coupled to the coupling section 111A, and an extending direction of the abutting section 111B is parallel to extending directions of the first side 311 and the second side 312 of the substrate 31. That is, in the positioning portion 111, after the bending of the step S04, the coupling section 111A extends along the first direction D1, and the abutting section 111B extends along the third direction D3. Thus, the positioning portion 111 is face-to-face attached to the first surface 315 of the substrate 31 by the abutting section 111B, ensuring the positioning stability of the lighting board 30.

Figure 8:
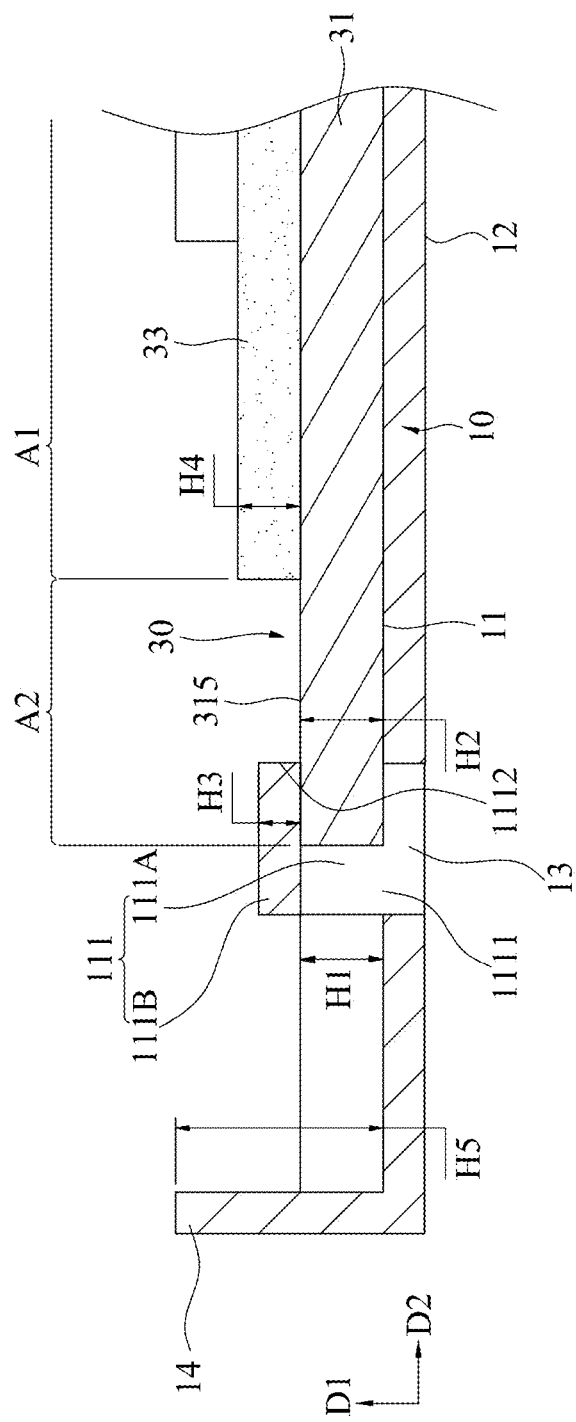
FIG. 8 is a sectional schematic view illustrating along a sectional line 8-8 in FIG. 2.

Referring to FIG. 8, FIG. 8 is a sectional schematic view illustrating along a sectional line 8-8 in FIG. 2. In certain embodiments where the positioning portion 111 includes the coupling section 111A and the abutting section 111B, the coupling section 111A has a first thickness H1 in the first direction D1, the substrate 31 of the lighting board 30 has a second thickness H2 between the first surface 315 and the second surface 316 in the first direction D1, and the first thickness H1 is equal to the second thickness H2. Thus, the abutting section 111B of the positioning portion 111 is completely attached on the first surface 315 of the substrate 31, such that the contact area between the abutting section 111B of the positioning portion 111 and the substrate 31 is maximized, ensuring the full resource utilization.

Referring to FIG. 8, in certain embodiments where the lighting board 30 includes the flip chip adhesive layer 33, the back plate 10 has a third thickness H3 in the first direction D1, the flip chip adhesive layer 33 has a fourth thickness H4 in the first direction D4, and a sum of the first thickness H1 and the third thickness H3 is less than or equal to a sum of the second thickness H2 and the fourth thickness H4. Thus, it is ensured that the positioning portion 111, after bending and abutting against the substrate 31, does not exceed the height of the flip chip adhesive layer 33, thereby preventing from affecting the stacking of other film layers and components on the lighting board 30.

Figure 9:
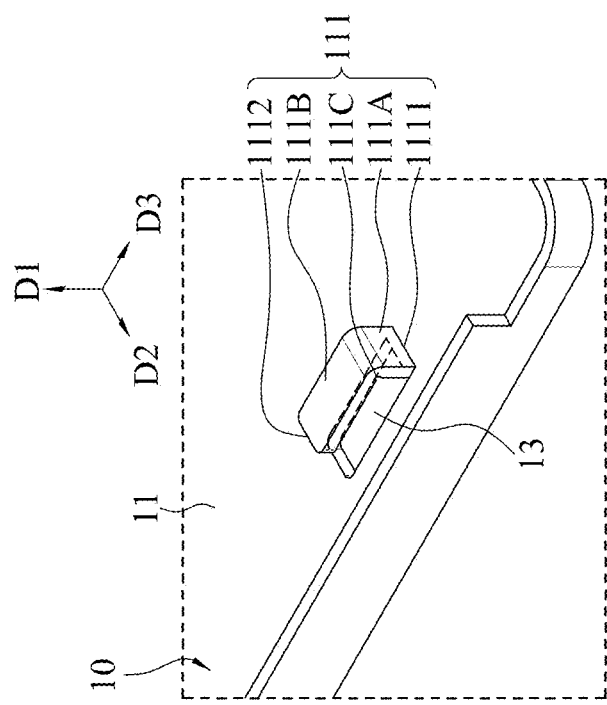
FIG. 9 is a partial schematic view of a back plate of a backlight module according to one embodiment of the present disclosure.

Referring to FIG. 9, FIG. 9 is a partial schematic view of a back plate of a backlight module according to one embodiment of the present disclosure. In certain embodiments, the positioning portion 111 of the back plate 10 further includes a turning portion 111C. The turning portion 111C is located at a coupling location of the coupling section 111A and the abutting section 111B, and a mechanical strength of the turning portion 111C is less than a mechanical strength of the coupling section 111A and a mechanical strength of the abutting section 111B. Thus, when the step S04 is to be performed, the force applied by the operator may ensure the positioning portion 111 bends at the turning portion 111C, thereby ensuring the positioning portion 111 after bending may be stably attached on the substrate 31. In certain embodiments where the positioning portion 111 includes the turning portion 111C, the turning portion 111C may be, without being limited to, a cut mark or a groove.

Figure 10:
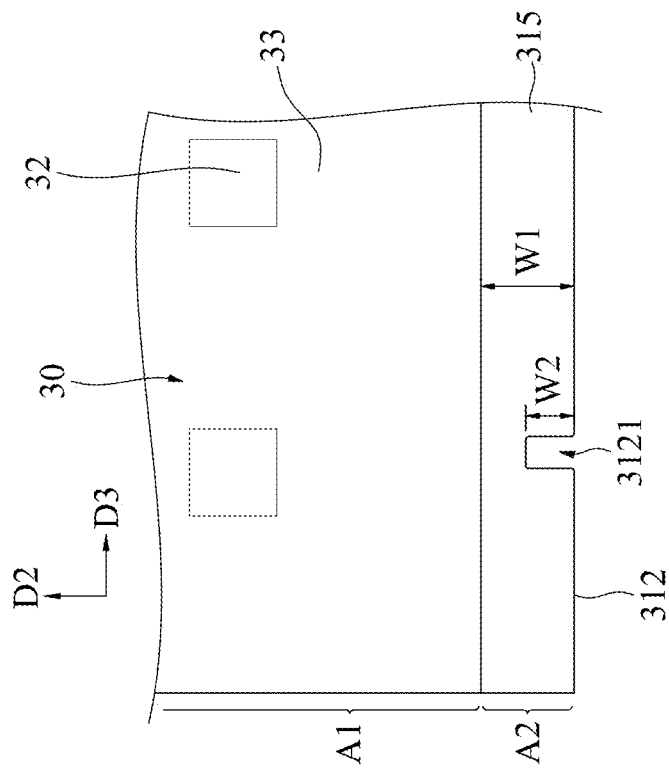
FIG. 10 is a partial schematic view of a lighting board of a backlight module according to one embodiment of the present disclosure.

Referring to FIG. 10, FIG. 10 is a partial schematic view of a lighting board of a backlight module according to one embodiment of the present disclosure. In certain embodiments, the peripheral region A2 of the substrate 31 of the lighting board 30 has a first width W1 in the second direction D2, the slot 3121 of the back plate 10 has a second width W2 in the second direction D2, and the second width W2 is less than the first width W1. Thus, when the lighting board 30 is sleeved on the positioning portion 111 of the back plate 10 by the slot 3121, even if the positioning portion 111 is accommodated to the slot bottom of the slot 3121, a gap may exist between the positioning portion 111 of the back plate 10 and the flip chip adhesive layer 33 in the second direction D2, thereby preventing the positioning portion 111 from contacting the flip chip adhesive layer 33 and damaging the flip chip adhesive layer 33 when bending the positioning portion 111.

Referring to FIGS. 1, 3 and 4, in certain embodiments, two positioning portion 111 are provided on the back plate 10, and two slots 3121 are provided on the substrate 31 of the lighting board 30. In these embodiments, the two positioning portions 111 are symmetrically disposed on the back plate 10, and the shapes of the two positioning portions 111 are provided to be symmetrical. Specifically, the two positioning portions 111 respectively penetrate through the back plate 10, the two positioning portions 111 are respectively adjacent to the two opposite sides of the back plate 10 in the third direction D3, and distances between the two positioning portions 111 and the two opposite sides of the back plate 10 in the third direction D3 are identical, such that the positions of the two positioning portions 111 on the back plate 10 are symmetrical. In addition, the two ends 1112 of the two positioning portions 111 face toward each other, such that the shapes of the two positioning portions 111 on the back plate 10 are symmetrical.

Referring to FIGS. 1 and 8, in certain embodiments, the back plate 10 further includes a plurality of stopping walls 14 disposed at the peripheral edges of the back plate 10, and each stopping wall 14 protrudes from the front surface 11. In these embodiments, each stopping wall 14 has a fifth thickness H5 in the first direction D1, and the fifth thickness is greater than the sum of the second thickness H2 and the fourth thickness H4. Thus, the stopping walls 14 may prevent the lighting board 30 or other components from detaching from the peripheral edges of the back plate 10 during the assembly process or usage, thereby enhancing assembly convenience and structural stability.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A backlight module, comprising:
a back plate, comprising a positioning portion;
a plurality of conductive colloids, disposed on a surface of the back plate; and
a lighting board, comprising:
a substrate, comprising a first side and a second side opposite to each other and a first surface and a second surface opposite to each other, wherein the first surface of the substrate is divided into a light-emitting region and a peripheral region, the second surface of the substrate has a plurality of exposed copper regions overlapping with the light-emitting region, the light-emitting region is adjacent to the first side, the peripheral region is adjacent to the second side, the peripheral region has a slot, the slot penetrates through the first surface and the second surface and extends to the second side, the substrate is sleeved on and positioned to the positioning portion by the slot, the positioning portion is bendable from the back plate to abut against the peripheral region of the first surface of the substrate, the substrate faces toward the back plate and is adhered to the conductive colloids by the second surface of the substrate, the conductive colloids are adhered to the exposed copper regions on the second surface of the substrate, and positions of the conductive colloids correspond to the light-emitting region; and
a plurality of light-emitting components, disposed on the light-emitting region.

2. The backlight module according to claim 1, wherein the lighting board further comprises a flip chip adhesive layer, covering and disposed on the first surface of the substrate and corresponding to the light-emitting region.

3. The backlight module according to claim 1, wherein the positioning portion comprises a coupling section and an abutting section, the coupling section is perpendicularly coupled to the back plate, the abutting section is perpendicularly coupled to the coupling section, and an extending direction of the abutting section is parallel to the first side and the second side.

4. The backlight module according to claim 3, wherein a direction perpendicular to the first surface and the second surface is defined as a first direction, the coupling section has a first thickness in the first direction, the substrate has a second thickness between the first surface and the second surface in the first direction, and the first thickness is equal to the second thickness.

5. The backlight module according to claim 4, wherein the lighting board further comprises a flip chip adhesive layer, covering and disposed on the first surface of the substrate and corresponding to the light-emitting region, the back plate has a third thickness in the first direction, the flip chip adhesive layer has a fourth thickness in the first direction, and a sum of the first thickness and the third thickness is less than or equal to a sum of the second thickness and the fourth thickness.

6. The backlight module according to claim 3, wherein the positioning portion further comprises a turning portion located at a coupling location of the coupling section and the abutting section, and a mechanical strength of the turning portion is less than a mechanical strength of the coupling section and a mechanical strength of the abutting section.

7. The backlight module according to claim 6, wherein the turning portion is a cut mark or a groove.

8. The backlight module according to claim 1, wherein a direction perpendicularly connecting the first side and the second side is defined as a second direction, the peripheral region has a first width in the second direction, the slot has a second width in the second direction, and the second width is less than the first width.

9. An assembly method of the backlight module according to claim 1, comprising:
providing the back plate, comprising the positioning portion;
providing the conductive colloids, disposed on a side of the back plate;
providing the lighting board, comprising the slot, wherein the lighting board is sleeved on the positioning portion by the slot in a direction parallel to the back plate and is adhered to the conductive colloids; and
bending the positioning portion such that the positioning portion abuts against the lighting board.

10. A backlight module, comprising:
a back plate, comprising a positioning portion;
a plurality of conductive colloids, disposed on a surface of the back plate; and
a lighting board, comprising:
a substrate, comprising a first side and a second side opposite to each other and a first surface and a second surface opposite to each other, wherein the first surface of the substrate is divided into a light-emitting region and a peripheral region, the light-emitting region is adjacent to the first side, the peripheral region is adjacent to the second side, the peripheral region is completely located between the second side and the light-emitting region, the light-emitting region is completely located between the first side and the peripheral region, the peripheral region has a slot, the slot penetrates through the first surface and the second surface and extends to the second side, the substrate is sleeved on and positioned to the positioning portion by the slot, the positioning portion abuts against the peripheral region, the substrate faces toward the back plate and is adhered to the conductive colloids by the second surface, and positions of the conductive colloids correspond to the light-emitting region; and
a plurality of light-emitting components, disposed on the light-emitting region.

11. The backlight module according to claim 10, wherein the lighting board further comprises a flip chip adhesive layer, covering and disposed on the first surface of the substrate and corresponding to the light-emitting region.

12. The backlight module according to claim 10, wherein the positioning portion comprises a coupling section and an abutting section, the coupling section is perpendicularly coupled to the back plate, the abutting section is perpendicularly coupled to the coupling section, and an extending direction of the abutting section is parallel to the first side and the second side.

13. The backlight module according to claim 12, wherein a direction perpendicular to the first surface and the second surface is defined as a first direction, the coupling section has a first thickness in the first direction, the substrate has a second thickness between the first surface and the second surface in the first direction, and the first thickness is equal to the second thickness.

14. The backlight module according to claim 13, wherein the lighting board further comprises a flip chip adhesive layer, covering and disposed on the first surface of the substrate and corresponding to the light-emitting region, the back plate has a third thickness in the first direction, the flip chip adhesive layer has a fourth thickness in the first direction, and a sum of the first thickness and the third thickness is less than or equal to a sum of the second thickness and the fourth thickness.

15. The backlight module according to claim 12, wherein the positioning portion further comprises a turning portion located at a coupling location of the coupling section and the abutting section, and a mechanical strength of the turning portion is less than a mechanical strength of the coupling section and a mechanical strength of the abutting section.

16. The backlight module according to claim 15, wherein the turning portion is a cut mark or a groove.

17. The backlight module according to claim 10, wherein a direction perpendicularly connecting the first side and the second side is defined as a second direction, the peripheral region has a first width in the second direction, the slot has a second width in the second direction, and the second width is less than the first width.

18. The backlight module according to claim 10, wherein the second surface of the substrate has a plurality of exposed copper regions, and the conductive colloids are disposed on the exposed copper regions.

* * * * *